(12) United States Patent
Okabe et al.

(10) Patent No.: US 12,464,082 B2
(45) Date of Patent: Nov. 4, 2025

(54) DISPLAY CONTROL APPARATUS

(71) Applicant: Panasonic Intellectual Property Management Co., Ltd., Osaka (JP)

(72) Inventors: Yoshimasa Okabe, Kanagawa (JP); Masayoshi Michiguchi, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 368 days.

(21) Appl. No.: 18/134,165

(22) Filed: Apr. 13, 2023

(65) Prior Publication Data
US 2023/0344955 A1 Oct. 26, 2023

(30) Foreign Application Priority Data
Apr. 26, 2022 (JP) ................. 2022-072548

(51) Int. Cl.
*H04N 5/272* (2006.01)
*G06F 3/14* (2006.01)
*H04N 5/262* (2006.01)

(52) U.S. Cl.
CPC ........... *H04N 5/2628* (2013.01); *H04N 5/272* (2013.01)

(58) Field of Classification Search
None
See application file for complete search history.

(56) References Cited

U.S. PATENT DOCUMENTS

| 2011/0025489 A1* | 2/2011 | Shimoda | B60R 1/28 340/459 |
| 2016/0182823 A1* | 6/2016 | Murasumi | B60R 1/28 348/38 |
| 2019/0344828 A1* | 11/2019 | Omori | B60W 50/14 |
| 2020/0267353 A1* | 8/2020 | Ishida | B60K 35/22 |
| 2022/0185183 A1* | 6/2022 | Kida | B60R 1/27 |

FOREIGN PATENT DOCUMENTS

| JP | 2011254190 | * 12/2011 | ............... G06T 1/00 |
| JP | 2015-061212 | 3/2015 | |
| JP | 2015088942 | * 5/2015 | ............. H04N 5/225 |

* cited by examiner

*Primary Examiner* — Beniyam Menberu
(74) *Attorney, Agent, or Firm* — Greenblum and Bernstein, P.L.C.

(57) ABSTRACT

Provided is a display control apparatus including: an image inputter; a vehicle periphery image generator that generates a vehicle periphery image; a subject image outputter that outputs a subject image; and an image superimposer that generates a display image by superimposing the subject image on the vehicle periphery image. An azimuth of a first line of sight is substantially identical to an azimuth of a second line of sight.

13 Claims, 12 Drawing Sheets

DISPLAY CONTROL APPARATUS

TECHNICAL FIELD

The present disclosure relates to a display control apparatus.

BACKGROUND ART

In the related art, there is known a technique of generating and displaying, based on images outputted from a plurality of in-vehicle cameras that captures the periphery of a vehicle, a vehicle image (subject image) viewed from a virtual visual point and a vehicle surrounding image indicating the surroundings of the vehicle.

For example, Patent Literature (hereinafter referred to "PTL") 1 discloses a configuration in which a virtual visual point image indicating the periphery of a vehicle and a vehicle body of the vehicle viewed from a virtual visual point present within a cabin of the vehicle is continuously generated while moving a visual point position and a line-of-sight direction within the cabin. By displaying the virtual visual point image while changing the direction of the line of sight, it is possible to generate a display image in which it is imagined to look around the surroundings of the vehicle. When the visual point position in the virtual visual point image is placed within the cabin at which the driver is positioned, however, the difference between the virtual visual point and the visual point of the driver is reduced and the virtual visual point image becomes closer to the image viewed from the driver, and thus, it is possible to make the display image more visible.

CITATION LIST

Patent Literature

PTL 1

Japanese Patent Application Laid-Open No. 2015-061212

SUMMARY OF INVENTION

Technical Problem

Solution to Problem

A display control apparatus according to the present disclosure includes a processor that is mounted in a vehicle and receives a captured image obtained by capturing a periphery of the vehicle. The processor generates, based on the captured image having been received, a vehicle periphery image indicating the periphery of the vehicle viewed from a first virtual visual point. The processor outputs, based on three-dimensional data indicating a subject which monitors the periphery of the vehicle and is one of an occupant of the vehicle, the vehicle, or both the vehicle and the occupant, a subject image indicating the subject viewed from a second virtual visual point different from the first virtual visual point. The processor generates a display image by superimposing the subject image on the vehicle periphery image. An azimuth of a first line of sight, in which the periphery of the vehicle is viewed from the first virtual visual point, is substantially identical to an azimuth of a second line of sight, in which the subject is viewed from the second virtual visual point.

Advantageous Effects of Invention

According to the present disclosure, it is possible to intuitively grasp a direction indicated by a vehicle periphery image.

DESCRIPTION OF EMBODIMENTS

Embodiment

Figure 1:
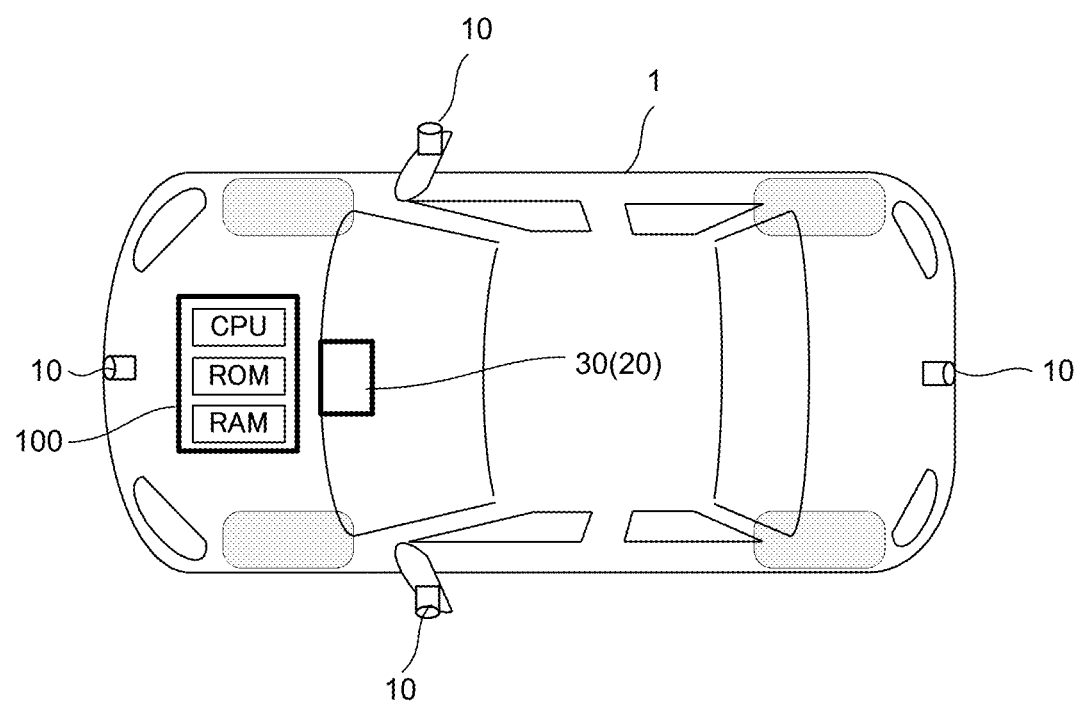
FIG. 1 illustrates a vehicle to which a display control apparatus according to an embodiment of the present disclosure is applied.
Figure 2:
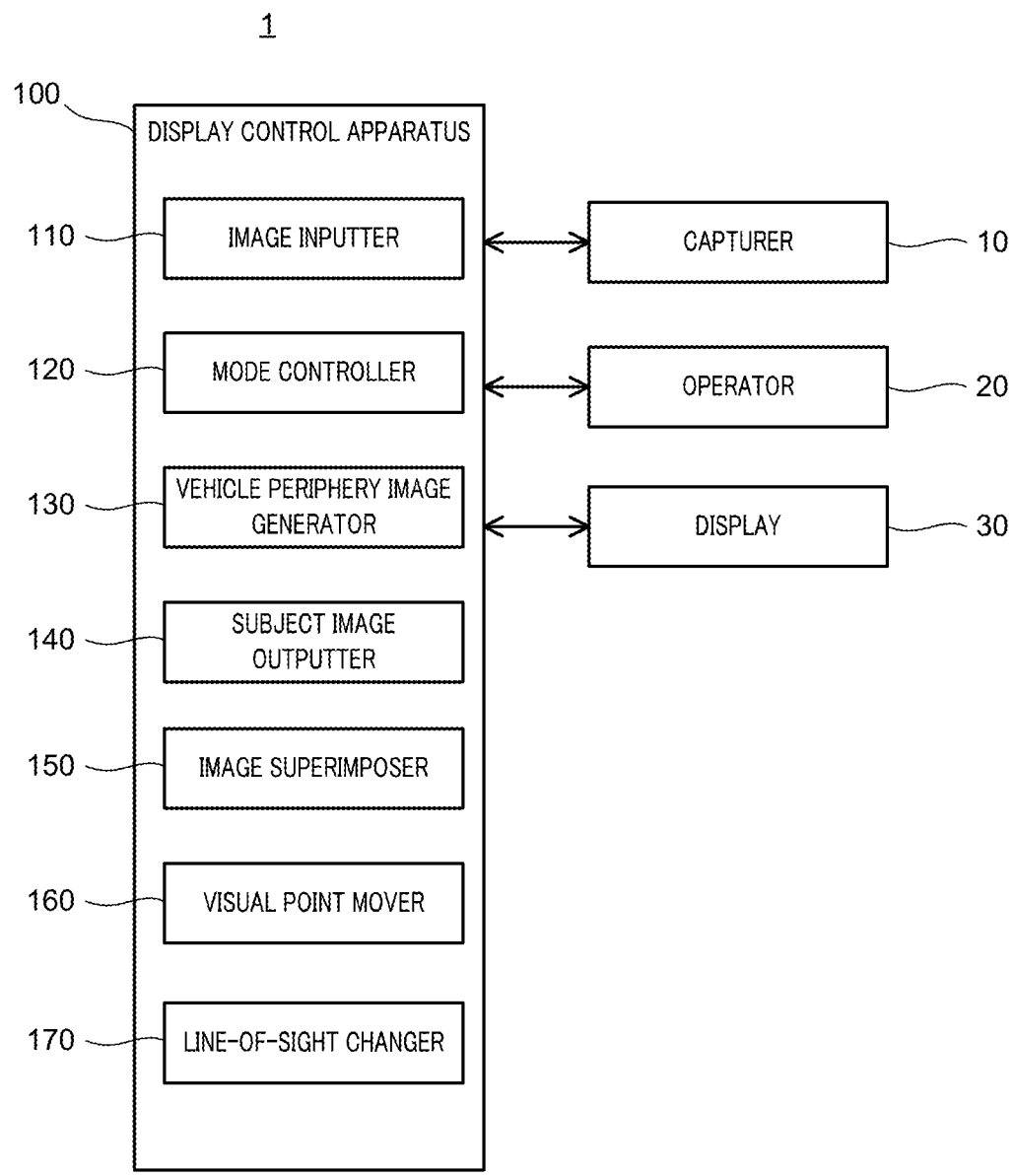
FIG. 2 is a block diagram illustrating the vehicle to which the display control apparatus according to the present embodiment is applied.

Hereinafter, an embodiment of the present disclosure will be described with reference to the accompanying drawings. FIG. 1 illustrates vehicle 1 to which display control apparatus 100 according to an embodiment of the present disclosure is applied. FIG. 2 is a block diagram illustrating vehicle 1 to which display control apparatus 100 according to the present embodiment is applied.

As illustrated in FIGS. 1 and 2, vehicle 1 configures a vehicle periphery display system capable of capturing the periphery of vehicle 1 and displaying a captured image to an occupant of vehicle 1 and includes a plurality of capturers 10, operator 20, display 30, and display control apparatus 100.

The plurality of capturers 10 is in-vehicle cameras each of which is provided at four positions of the front, left, right, and rear portions of vehicle 1, respectively, and is capable of capturing images in four directions of the front, left, right, and rear of vehicle 1.

Figure 3:
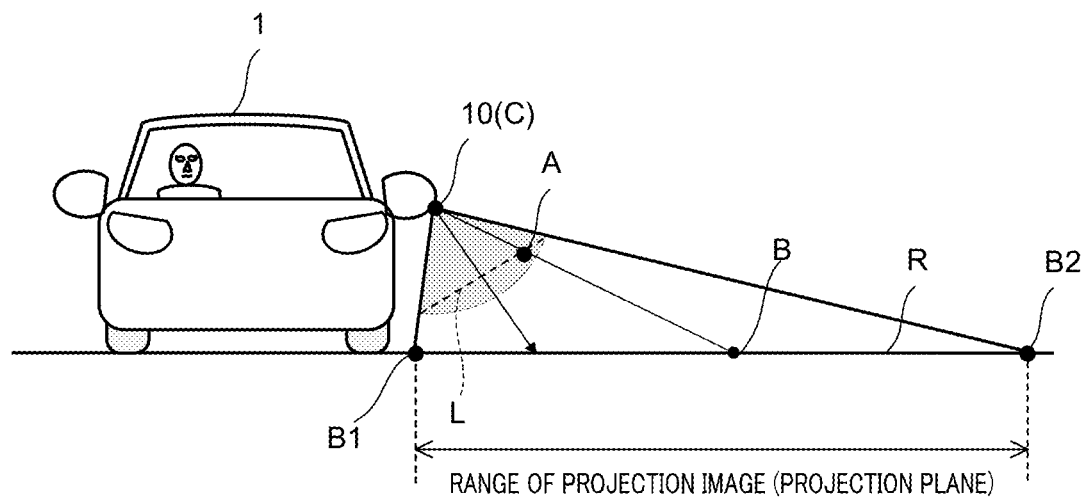
FIG. 3 is a diagram provided for describing projection conversion.

The plurality of capturers 10 is attached obliquely downward with an angel of depression so as to capture mainly the road surface (see also FIG. 3). The visual-field angle of each capturer 10 is equal to or greater than 190 degrees, and four capturers 10 allow the entire surroundings of vehicle 1 to come into sight. The plurality of capturers 10 transmits captured images in the four directions to display control apparatus 100.

Note that, the number of capturers 10 is not limited to four. Further, the positions of capturers 10 are not limited to the positions illustrated in FIG. 1. For example, a display image may be combined from captured images of a total of six capturers obtained by adding capturers for side and rear monitoring with a visual-field angle of approximately 45 degrees.

Operator 20 is, for example, an operation button of an in-vehicle apparatus (display 30 or the like), which can be operated by the user (occupant), or a portion (steering wheel, gas pedal, brake pedal or the like) at which the user performs a driving operation. Operator 20 transmits information on an operation of the user (an operation of the operation button or a driving operation of vehicle 1) to display control apparatus 100.

Display 30 is a display shared with an in-vehicle apparatus such as a navigation apparatus, for example, and displays a display image generated by display control apparatus 100. Display 30 may be, for example, a touch screen and may have the function of operator 20 described above.

Display control apparatus 100 is, for example, an electronic control unit (ECU) mounted in vehicle 1, and includes a central processing unit (CPU), a read only memory (ROM), a random access memory (RAM), and input/output circuitry. Display control apparatus 100 displays a display image, which has been generated based on images of the surroundings of vehicle 1 acquired from four capturers 10, on display 30 based on a preconfigured program. Specifically, display control apparatus 100 outputs a display image, which continuously changes as if an occupant of vehicle 1 looks around the surroundings of vehicle 1, to display 30.

As illustrated in FIG. 2, display control apparatus 100 includes image inputter 110, mode controller 120, vehicle periphery image generator 130, subject image outputter 140, image superimposer 150, visual point mover 160, and line-of-sight changer 170. Note that, FIG. 2 does not limit the physical configuration, the number of parts, or the functional inclusion relationship in the display control apparatus. For example, there may be a plurality of operators 20, and visual point mover 160 may be incorporated as a function of line-of-sight changer 170.

Mode controller 120 configures the format (display mode) of a display image based on information on an operation of the user. For example, in a case where the user performs an operation to activate vehicle 1, mode controller 120 configures such that a display image generated by vehicle periphery image generator 130, subject image outputter 140, and image superimposer 150, which are described later, is displayed on display 30. Further, in a case where the user performs an operation to start driving vehicle 1 or an operation to stop vehicle 1, such as turning off the ignition key, mode controller 120 configures such that the display image described above is not displayed on display 30.

Image inputter 110 receives images, which have been obtained by capturing the periphery of vehicle 1, from four capturers 10 and outputs captured images that have been subjected to distortion correction such as lens distortion correction. For example, as illustrated in FIG. 3, the visual-field range of capturer 10, which is provided in the left portion of vehicle 1, in the left-right direction in a case where capturer 10 is viewed from the front is a range of an arc centered on position C of capturer 10. In FIG. 3, capturer 10 provided in the left portion of vehicle 1 is exemplified as an example, but the same applies to capturers 10 in the front, right, and rear portions. Note that, even in a case where capturer 10 is viewed from a lateral side, the visual-field range of capturer 10 in the front-rear direction has a range of an arc centered on position C of capturer 10.

Image inputter 110 acquires a captured image having been subjected to the distortion correction such that the captured image is associated with pixels on a rectangular region covering the visual-field range. The rectangular region is, for example, a region surrounded by line L, which connects both ends of the arc of the visual-field range in the left-right direction indicated in FIG. 3, and a line (not illustrated), which connects both ends of the arc of the visual-field range in the front-rear direction. The distortion correction may be performed by display control apparatus 100, may be performed by capturer 10 or may be by any other correction apparatus.

Vehicle periphery image generator 130 generates, based on the image received by image inputter 110, a vehicle periphery image in which the periphery of vehicle 1 is viewed from a first virtual visual point. Specifically, vehicle periphery image generator 130 projects the respective captured images of four capturers 10 on a projection plane (for example, a flat plane corresponding to the road surface) to combine the respective captured images into one overhead image.

Specifically, vehicle periphery image generator 130 performs projection conversion (first projection) that reads (associates) pixels on the captured image received by image inputter 110 as (with), for example, pixels on the flat plane of road surface R. For example, a point where an extension line of a line connecting position C of capturer 10 and pixel A on the captured image intersects road surface R is projection point B.

Such projection conversion is performed for every pixel on the captured image to thereby obtain a projection image that is an aggregate of pixels projected on road surface R. In the left-right direction, the range of the projection image on road surface R is a range of points B1 and B2 at which extension lines of lines connecting the pixels of the both end portions of line L, which is the range of the captured image, and position C of capturer 10 intersect road surface R, respectively. Although not illustrated, even in the front-rear direction, the range of the projection image on road surface R is a range of points at which extension lines of lines connecting the pixels of the both end portions of the range of the captured image and position C of capturer 10 intersect road surface R, respectively. The region surrounded by these ranges is a projection plane.

Figure 4:
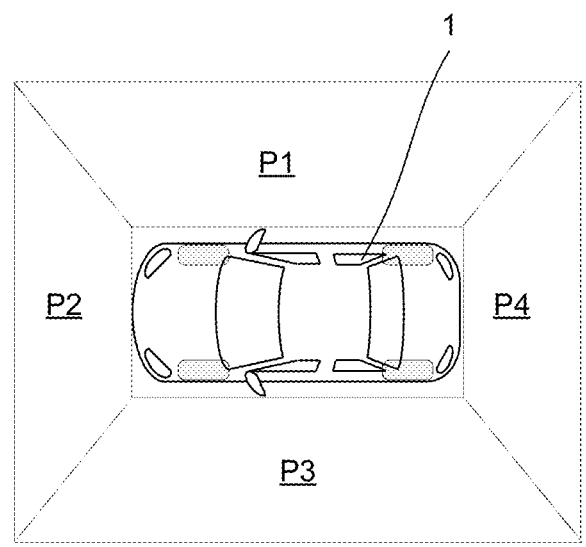
FIG. 4 illustrates a range of a panoramic image of the vehicle.

Since projection images can be generated based on captured images of each capturer 10, respectively, a panoramic projection image of vehicle 1 can be obtained by four capturers 10 as illustrated in FIG. 4, for example. P1 in FIG. 4 is a projection plane by capturer 10 in the right portion of vehicle 1. P2 in FIG. 4 is a projection plane by capturer 10 in the front portion of vehicle 1. P3 in FIG. 4 is a projection plane by capturer 10 in the left portion of vehicle 1. P4 in FIG. 4 is a projection plane by capturer 10 in the rear portions of vehicle 1.

An image in which the projection image described above is viewed from a virtual visual point positioned above vehicle 1 is an overhead image. That is, vehicle periphery image generator 130 generates an overhead image in which a projection image is viewed from a first virtual visual point. It can be said that the overhead image is an image in which an image that has been projected (first projection) on road surface R is projected again (second projection) by changing the visual point.

One image into which four overhead images based on the respective captured images of capturers 10 provided at the front, rear, left, and right of vehicle 1, respectively, are combined is a panoramic image. That is, vehicle periphery image generator 130 generates a panoramic image as a vehicle periphery image. A change of a visual point position, from which an image is viewed, from the actual visual point (the position of capturer 10) to a virtual visual point is also referred to as visual point conversion.

Figure 5A:
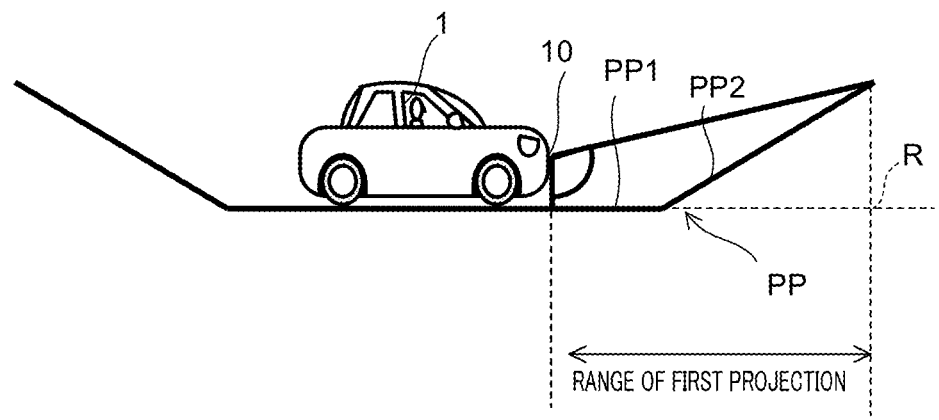
FIG. 5A is a diagram provided for describing first projection.

Incidentally, an image obtained when a distant landscape or a stereoscopic object is projected on road surface R becomes unnatural elongated in a direction going away. Accordingly, in the present embodiment, not road surface R, but a plane erected from road surface R in a distance from vehicle 1 is projection plane PP as illustrated in FIG. 5A. More specifically, projection plane PP is formed of, for example, first plane PP1, which extends a predetermined distance from vehicle 1 on road surface R, and second plane PP2, which is inclined from an end of first plane PP1 such that the position of second plane PP2 becomes higher as second plane PP2 is away from vehicle 1. The predetermined distance is, for example, a distance corresponding to a range that is not higher than vehicle 1. The range of such a projection plane is the range of the first projection.

Figure 5B:
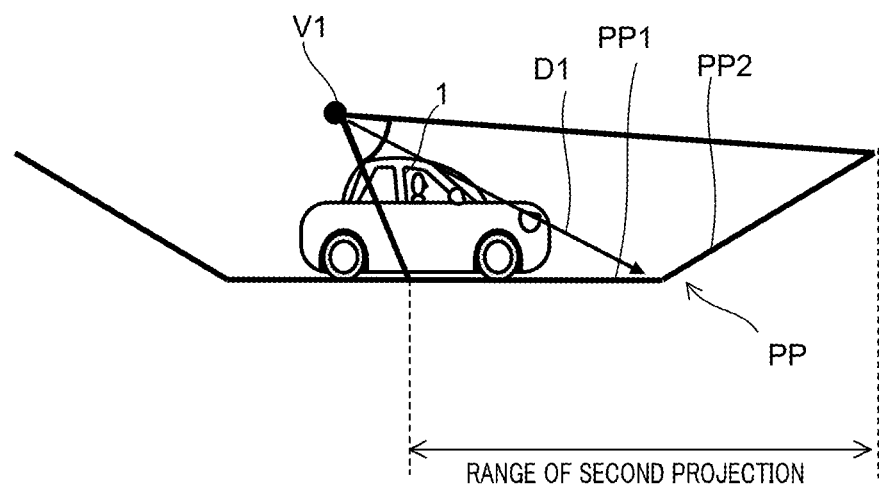
FIG. 5B is a diagram provided for describing second projection.

Further, an overhead image in which vehicle 1 is viewed down from just above deviates from an image viewed by the driver. Accordingly, for example, as illustrated in FIG. 5B, when the overhead image is converted (second projection) into an image viewed from a visual point position (first virtual visual point V1) diagonally above vehicle 1, the converted image becomes closer to a visual image viewed by the driver.

For example, it is assumed that a position slightly above the tail portion of vehicle 1 is first virtual visual point V1 and a projection plane is viewed from this first virtual visual point V1. A direction that becomes the center of a visual-field range with first virtual visual point V1 as the visual point position is line-of-sight direction D1 that is virtual. This line-of-sight direction D1 does not pass through the positions of the driver's eyes, but is closer to the line of sight of the driver than a line-of-sight direction viewed down from just above. Projection plane PP (first plane PP1 on road surface R and second plane PP2 that is inclined) included in visual-field ranges in the up-down and left-right directions centered on line-of-sight direction D1 from first virtual visual point V1 becomes the range of the second projection.

When only a captured image of capturer 10 is subjected to visual point conversion and is displayed on display 30, it may be impossible to grasp which direction is displayed. In the present embodiment, on the other hand, the figure of vehicle 1 comes into sight by lowering the visual point position slightly rearward and disposing the visual point position above vehicle 1, and thus, it is possible to grasp, by using the figure of vehicle 1 as a reference, which direction is displayed.

However, since vehicle 1 is not reflected in capturer 10, it is necessary to complement the figure of vehicle 1. Further, within the range of the second projection, at least a range positioned on a lower side of vehicle 1 is a blind-spot region that is not reflected in capturer 10, and becomes a blank region in a vehicle periphery image. Accordingly, subject image outputter 140 and image superimposer 150 generate a display image obtained by superimposing a subject image, in which a three-D (three-dimensional) model of vehicle 1 is viewed from a virtual visual point (second virtual visual point V2), on a blind-spot region in a vehicle periphery image.

Subject image outputter 140 outputs, for example, based on a three-D model (three-dimensional data) that simulates vehicle 1, a subject image corresponding to a figure in which vehicle 1 is viewed from the second virtual visual point different from the first virtual visual point. Here, vehicle 1 will be referred to as a subject in the sense that vehicle 1 is a subject that monitors a vehicle periphery image, and an image outputted based on a three-D model (three-dimensional data) of the subject will be referred to as a subject image. A subject image including a vehicle may be referred to as a vehicle image, and a vehicle image may be read as a subject image.

Image superimposer 150 superimposes a subject image on a vehicle periphery image to generate a display image.

Figure 6A:
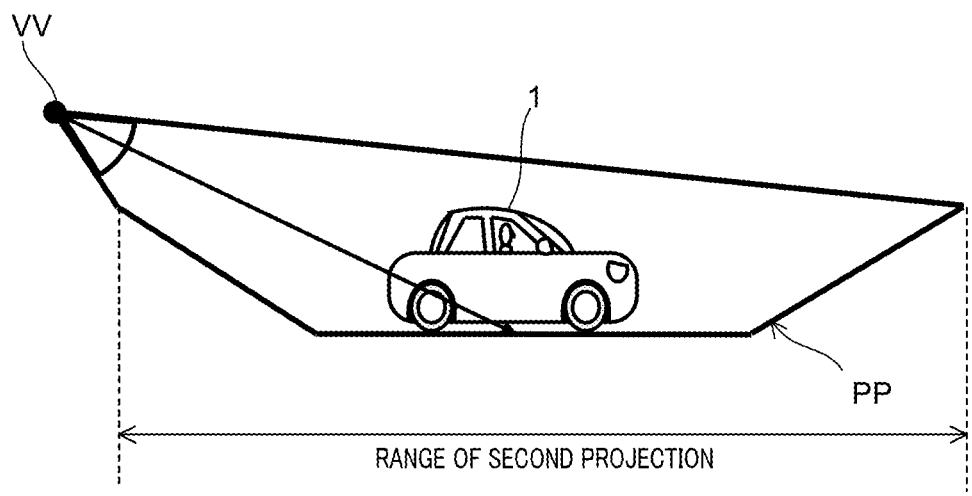
FIG. 6A is a diagram provided for describing a visible portion when a virtual visual point is shifted to the rear of the vehicle.

For causing a display image to allow an occupant of vehicle 1 to understand which direction it is in the surroundings of vehicle 1, it may be configured such that the second virtual visual point is away from vehicle 1, the vehicle body in its entirety is reflected on the display image, and it is understandable by using the orientation of vehicle 1 as a reference which direction a vehicle periphery image is in. For example, as illustrated in FIG. 6A, when visual point position VV away from vehicle 1 is circulated while maintaining the distance of visual point position VV from vehicle 1 in a state in which the line of sight is directed from visual point position VV toward vehicle 1, and a subject image in which a three-D model of vehicle 1 rotates in accordance with the circulation of visual point position VV is superimposed on a vehicle periphery image and is displayed, a display image that changes in a way of looking around the surroundings of vehicle 1 is obtained.

However, when visual point position VV is lowered to the rear of vehicle 1, the road surface to the rear of vehicle 1 (a side of visual point position VV) is closer to visual point position VV than the road surface to the front of vehicle 1 (the other side), and thus, vehicle 1 is displayed larger on display 30 than on the other side of vehicle 1 to which the line of sight is directed. As a result, the other side of vehicle 1 is displayed small on a display image.

Figure 6B:
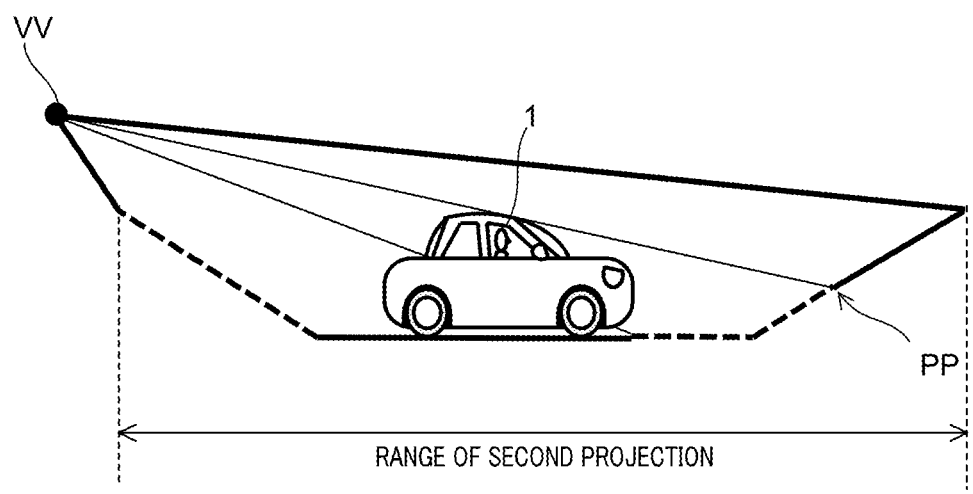
FIG. 6B is a diagram provided for describing a less visible portion when the virtual visual point is shifted to the rear of the vehicle.

Further, as illustrated in FIG. 6B, as visual point position VV is lowered more to the rear of vehicle 1, the second projection is performed at the shallower angle, and thus, among figures on projection plane PP, a figure projected on the dashed-line portion on the side of visual point position VV of vehicle 1 is displayed, compressed (collapsed) in the up-down direction, on the display screen of display 30. Accordingly, it becomes impossible to understand what is displayed on display 30.

Further, since the figure of vehicle 1 is superimposed on a vehicle periphery image on the other side of vehicle 1 to which the line of sight is directed, the vehicle periphery image cannot be visually recognized in a portion shadowed by the figure of the vehicle body (the dashed-line portion on a side opposite to the side of visual point position VV with respect to vehicle 1), that is, the center portion of the display image.

As described above, when the visual point position (the position of the virtual visual point) is caused to be to the rear of vehicle 1 for the purpose of displaying the entire figure of vehicle 1, a vehicle periphery image in the line-of-sight direction becomes less visible, which is therefore not suitable for the purpose of safety confirmation of the periphery of vehicle 1.

Figure 7:
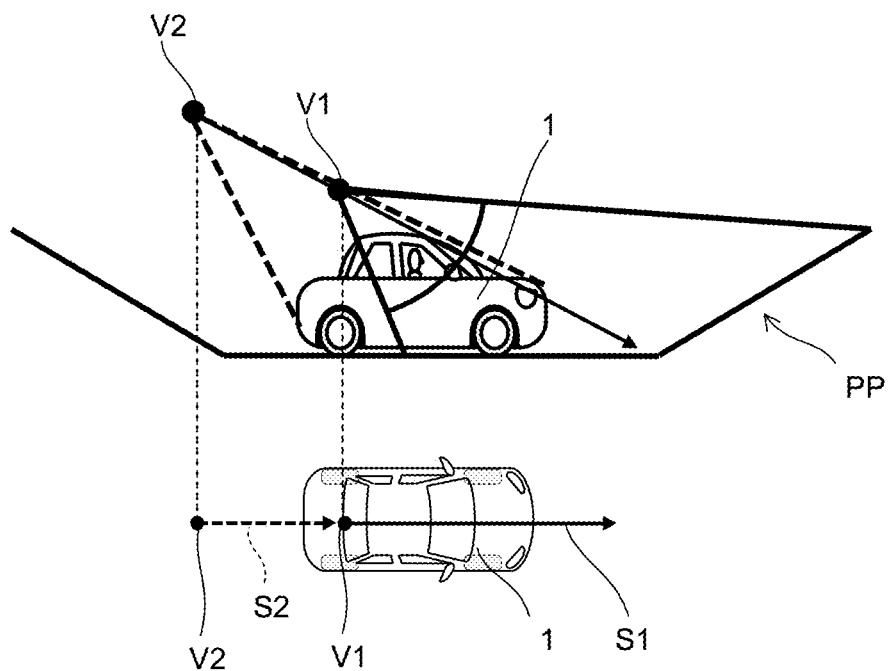
FIG. 7 illustrates disposition examples of a first virtual visual point and a second virtual visual point.

In the present embodiment, on the other hand, the visual point position (first virtual visual point V1) in a vehicle periphery image and the visual point position (second virtual visual point V2) in a subject image are separated and, as illustrated in FIG. 7, the visual point position (first virtual visual point V1) in the vehicle periphery image is caused to be a position not away from above vehicle 1. That is, the position of first virtual visual point V1 is a position that overlaps vehicle 1 when viewed from above. In other words, the horizontal position of first virtual visual point V1 overlaps the horizontal position of vehicle 1. In FIG. 7, a diagram of vehicle 1 viewed from a lateral side is illustrated on the upper side, and a diagram vehicle 1 viewed from above is illustrated on the lower side.

Then, it is configured such that the visual point position (second virtual visual point V2) in the subject image which is the image of vehicle 1 is a position rearward from first virtual visual point V1. That is, the position of second virtual visual point V2 is a position that does not overlap vehicle 1 when viewed from above. In other words, the horizontal position of second virtual visual point V2 does not overlap the horizontal position of vehicle 1.

In addition, second virtual visual point V2 is farther from vehicle 1 than first virtual visual point V1. In other words, the distance between second virtual visual point V2 and the subject (vehicle 1) is greater than the distance between first virtual visual point V1 and the subject (vehicle 1). In further other words, the distance between second virtual visual point V2 and projection plane PP to be displayed on display 30 is greater than the distance between first virtual visual point V1 and projection plane PP to be displayed on display 30.

Further, second virtual visual point V2 is positioned at a position to which the line-of-sight direction using first virtual visual point V1 as a reference is extended on a side opposite to projection plane PP such that vehicle 1 in its entirety is reflected. That is, the azimuth of first line of sight S1 in which the periphery of vehicle 1 is viewed from first virtual visual point V1 is substantially identical to the azimuth of second line of sight S2 in which vehicle 1 is viewed from second virtual visual point V2, and the azimuth of first virtual visual point V1 with respect to second virtual visual point V2 is substantially identical to the azimuth of second line of sight S2. The reason for using the expression of substantially identical is that the azimuth of first line of sight S1 and the azimuth of second line of sight S2 are not required to be identical at all times. For example, even when the azimuths of the line of sight are shifted from each other by approximately 5 degrees between a vehicle periphery image and a vehicle image, which are displayed on the same display image, due to a processing time required for the generation of a vehicle periphery image, it is not problematic at all for the driver to grasp which direction is the vehicle periphery image is displayed in. In particular, the accuracy of an angle in a display image is not important when vehicle 1 is not traveling and is not in a state in which vehicle 1 can immediately travel, either.

On the other hand, subject image outputter 140 outputs a vehicle image (subject image) in which vehicle 1 is viewed down from second virtual visual point V2. To be precise, subject image outputter 140 outputs, based on three-dimensional data (for example, a three-D model) of vehicle 1, a subject image corresponding to a figure of vehicle 1 viewed from second virtual visual point V2.

The three-dimensional data is, for example, data of a three-D model (for example, a polygon model) of vehicle 1. For example, in the case of a polygon model, the three-dimensional data is formed of a set (assembly) of coordinates of vertices of triangles forming a plane. A subject image on which a three-D model is projected can be generated by rotating the coordinates of the respective vertices in accordance with the direction of a line of sight and determining points at which lines starting from a visual point through the respective vertices intersect a projection plane. Subject image outputter 140 may generate and output a subject image based on a stored three-D model, or may previously store subject images generated by changing the visual point position and select and output one of the stored subject images in accordance with a designated visual point position. Here, instead of the virtual images generated by changing the virtual visual point, live-action images obtained by capturing a vehicle body in a plurality of directions may be used. In this case, the three-dimensional data indicating a subject is a live-action image obtained by capturing a vehicle body in a plurality of directions. Note that, since the example in which a three-D model is used is actually common, the use of a three-D model will be described in a working example.

Figure 8:
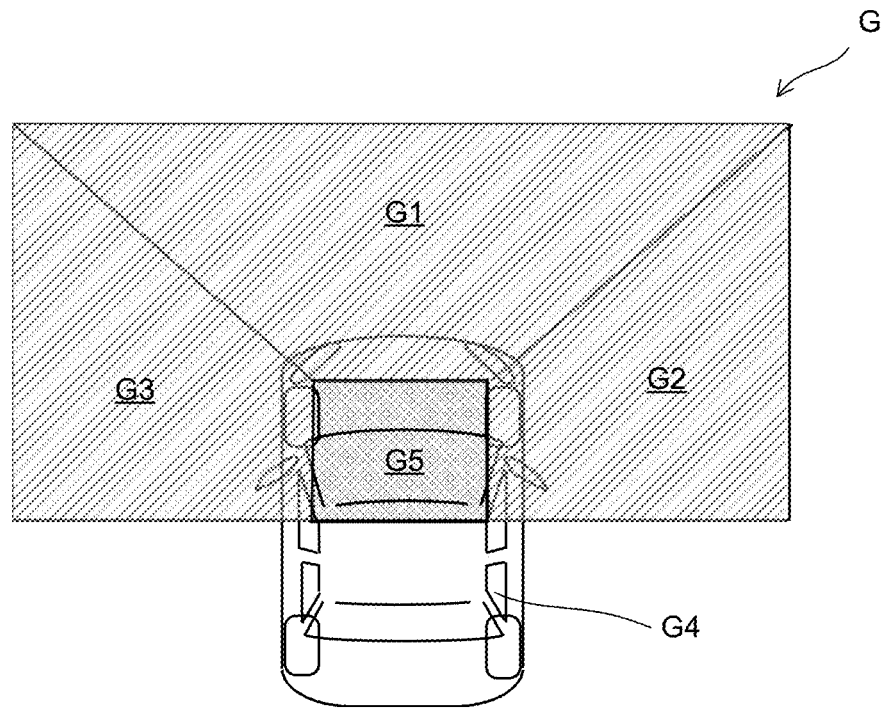
FIG. 8 illustrates an example of a display image.

Image superimposer 150 superimposes an outputted subject image on a portion which becomes a blind-spot region in a vehicle periphery image generated based on first virtual visual point V1. In other words, image superimposer 150 superimposes a subject image such that the subject image overlaps a blind-spot region, on which no image is projected, in a vehicle periphery image. The blind-spot region is a region beneath vehicle 1, which is not reflected on a captured image. For example, as illustrated in FIG. 8, display image G indicating the front of vehicle 1 is an image obtained by superimposing subject image G4, which is a three-D model of vehicle 1, on a vehicle periphery image obtained by combining overhead image G1 by capturer 10 at the front, overhead image G2 by capturer 10 at the right, and overhead image G3 by capturer 10 at the left. Subject image G4 is positioned so as to cover blind-spot region G5 that is not included in overhead images G1, G2, and G3.

Note that, in a vehicle periphery image indicated as a display image, an image viewed by the driver who directs his/her line of sight in one direction from the inside of vehicle 1 is imagined. Accordingly, a vehicle periphery image is, for example, not a 360-degree-full-azimuth region, but a region with a range of 90 degrees in the left-right direction from a line-of-sight direction, that is, an approximately half region. The vehicle periphery image in FIG. 8 is an example in which the driver is assumed to look ahead, and is therefore a region with only the front half.

Further, since an vehicle periphery image is viewed from first virtual visual point V1, a portion of a subject image viewed from second virtual visual point V2 (such as a portion rearward from the visual point of an occupant) is not covered by a display range in a vehicle periphery image based on the visual field of the occupant. Accordingly, it may be configured such that when subject image G4 is superimposed on a vehicle periphery image on display image G, a portion of subject image G4 is not covered by a display range in the vehicle periphery image.

Further, subject image G4 is based on a three-D model as viewed from second virtual visual point V2. Accordingly, when subject image G4 is superimposed on a vehicle periphery image, subject image G4 protrudes from blind-spot region G5. Since the portion of subject image G4, which protrudes from the blind-spot region in the vehicle periphery image, hides the vehicle periphery image, it may be configured such that subject image G4 is semi-transparent or a wireframe to make the vehicle periphery image visible through subject image G4.

Figure 9:
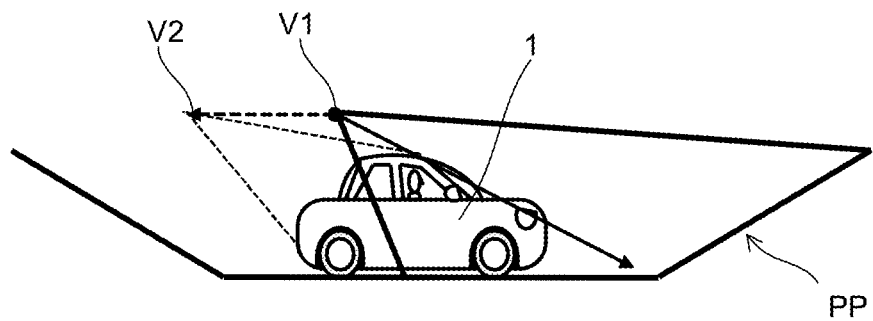
FIG. 9 illustrates another disposition example of the second virtual visual point.

Further, since a subject image is displayed for the purpose of indicating the azimuth of the line of sight in a vehicle periphery image, the line of sight based on the subject image (the azimuth of the first virtual visual point) and the azimuth of the subject image may be identical and the visual point (second virtual visual point) in the subject image is not necessarily on the extension line of the line of sight in the vehicle periphery image. For example, as illustrated in FIG. 9, the visual point (second virtual visual point V2) in a subject image may be at a position that is horizontally moved from the visual point (first virtual visual point V1) in a vehicle periphery image in a direction opposite to the azimuth of the line of sight in the vehicle periphery image. Further, since the subject may be an occupant or a combination of an occupant and a vehicle, the display control apparatus in the working example can be said to be a display control apparatus including: an image inputter that is mounted in a vehicle and receives a captured image obtained by capturing a periphery of the vehicle; a vehicle periphery image generator that generates, based on the captured image having been received by the image inputter, a vehicle periphery image indicating the periphery of the vehicle viewed from a first virtual visual point; a subject image outputter that outputs, based on three-dimensional data indicating a subject that monitors the periphery of the vehicle and is one of an occupant of the vehicle, the vehicle, or both the vehicle and the occupant, a subject image indicating the subject viewed from a second virtual visual point different from the first virtual visual point; and an image superimposer that generates a display image by superimposing the subject image on the vehicle periphery image. An azimuth of a first line of sight in which the periphery of the vehicle is viewed from the first virtual visual point is substantially identical to an azimuth of a second line of sight in which the subject is viewed from the second virtual visual point, and an azimuth of the first virtual visual point with respect to the second virtual visual point is substantially identical to the azimuth of the second line of sight.

As described above, a display image in which a subject image is superimposed on a vehicle periphery image may continue to display a vehicle-outside video in one direction, or may continuously change, by visual point mover 160 and line-of-sight changer 170, as if an occupant of vehicle 1 looks around the surroundings of vehicle 1.

Visual point mover 160 moves first virtual visual point V1 and second virtual visual point V2 with respect to vehicle 1. Line-of-sight changer 170 simultaneously changes both the azimuth of first line of sight S1 and the azimuth of second line of sight S2 in synchronization with the movement of first virtual visual point V1 or second virtual visual point V2. More specifically, line-of-sight changer 170 simultaneously changes both the azimuth of first line of sight S1 and the azimuth of second line of sight S2 such that the azimuth of first line of sight S1 is identical to the azimuth of second line of sight S2 and an azimuth of first virtual visual point V1 with respect to second virtual visual point V2 is identical to the azimuth of second line of sight S2. Note that, as described above, when the vehicle does not travel, the azimuth of first line of sight S1 and the azimuth of second line of sight S2 may be slightly shifted from each other, but the quality as a display improves when the azimuth of first line of sight S1 and the azimuth of second line of sight S2 are identical.

Figure 10A:
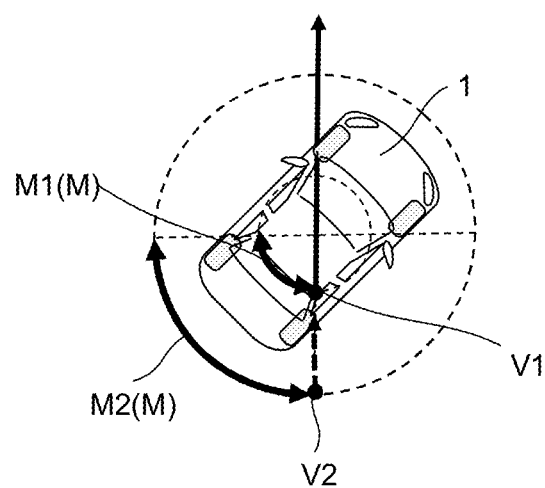
FIG. 10A illustrates examples of movement paths of the first virtual visual point and the second virtual visual point.
Figure 10B:
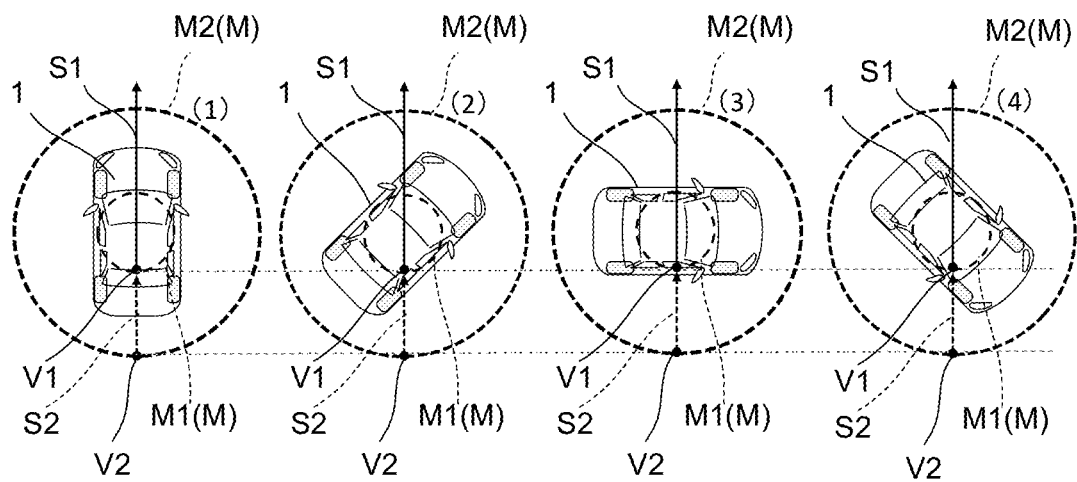
FIG. 10B illustrates examples of the movement paths of the first virtual visual point and the second virtual visual point.

As illustrated in FIGS. 10A and 10B, movement path M on which first virtual visual point V1 and second virtual visual point V2 move has a shape of a circle. In a case where both first virtual visual point V1 and second virtual visual point V2 move, the horizontal position of the center of a circle that is movement path M1 for one virtual visual point is identical to the horizontal position of the center of a circle that is movement path M2 for the other virtual visual point.

For example, as illustrated in FIG. 10A, two virtual visual points are disposed such that first virtual visual point V1 in a vehicle periphery image and second virtual visual point V2 in a subject image are on the same side as viewed from the center of the circle or the center of the vehicle. First virtual visual point V1 circulates on movement path M1 and second virtual visual point V2 circulates on movement path M2.

As described above, the rotation of a line-of-sight direction (a direction in which the first virtual visual point and the second virtual visual point are on the same line) with respect to vehicle 1 makes it possible to look around the full azimuth of vehicle 1 automatically as illustrated in FIG. 10B.

For example, in FIG. 10B, (1) is an example in which the azimuth of first line of sight S1 and the azimuth of second line of sight S2 in the line of sight face the front of vehicle 1, (2) is an example in which the azimuth of first line of sight S1 and the azimuth of second line of sight S2 in the line of sight face the left oblique front of vehicle 1, (3) is an example in which the azimuth of first line of sight S1 and the azimuth of second line of sight S2 in the line of sight face the left of vehicle 1, and (4) is an example in which the azimuth of first line of sight S1 and the azimuth of second line of sight S2 in the line of sight face the left oblique rear of vehicle 1.

In the case of (1) of FIG. 10B, the subject image in (1) is superimposed on the vehicle periphery image corresponding to the azimuth of first line of sight S1 and the azimuth of second line of sight S2 in the line of sight in (1) on a display image, and in the case of (2) of FIG. 10B, the subject image in (2) is superimposed on the vehicle periphery image corresponding to the azimuth of first line of sight S1 and the azimuth of second line of sight S2 in the line of sight in (2) on a display image. Further, in the case of (3) of FIG. 10B, the subject image in (3) is superimposed on the vehicle periphery image corresponding to the azimuth of first line of sight S1 and the azimuth of second line of sight S2 in the line of sight in (3) on a display image, and in the case of (4) of FIG. 10B, the subject image in (4) is superimposed on the vehicle periphery image corresponding to the azimuth of first line of sight S1 and the azimuth of second line of sight S2 in the line of sight in (4) on a display image.

As image processing, the visual point position (first virtual visual point) in a vehicle periphery image and the visual point position (second virtual visual point) in a subject image may be fixed, and an image on a projection plane on which the first projection has been performed and a three-D model of vehicle 1 may be rotated.

Further, an image on a projection plane and a three-D model of vehicle 1 may be fixed, and the first virtual visual point and the second virtual visual point may be rotated such that the line-of-sight direction of the first virtual visual point and the line-of-sight direction of the second virtual visual point become identical. In this case, the first virtual visual point and the second virtual visual point move on different circular orbits with the same rotation center such that the respective rotation angles are the same. Then, in synchronization with the movement thereof, the line-of-sight direction rotates so as to face the center of the circle at all times.

Further, line-of-sight changer 170 may rotate the line-of-sight direction continuously or may rotate the line-of-sight direction discretely (for example, by 45 degrees each time one second elapses).

Further, in a case where the line-of-sight direction is rotated continuously, a display image flowing in the lateral direction is displayed on the screen of display 30, and thus, it may be hard to confirm what is displayed. Accordingly, for example, line-of-sight changer 170 may decrease the rotational speed in the line-of-sight direction or may stop the rotation in accordance with an operation of the user.

For example, it is assumed that operator 20 and display 30 in touch screen form are applied. In this configuration, in a case where the user performs an operation, such as a touch or swiping, on the touch screen, line-of-sight changer 170 may change the visual point position or the rotational direction in accordance with the operation. For example, it may be configured such that although the line-of-sight direction rotates continuously in the initial state, the line-of-sight direction stops rotating by the touch of the user and the rotational direction in the visual point position is changed by swiping, or the rotation readability may be determined by the speed of swiping.

Figure 11:
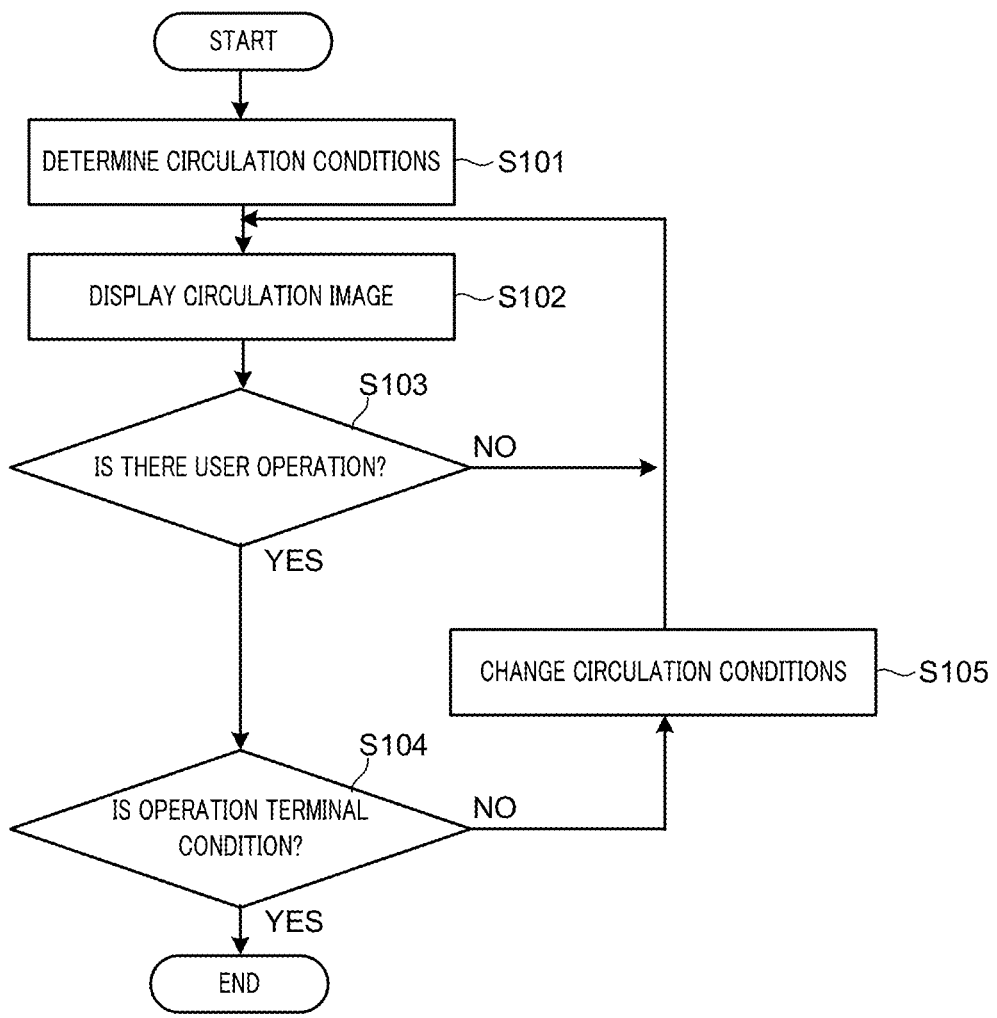
FIG. 11 is a flowchart illustrating a motion example of display control of the display control apparatus.

Next, a motion example of display control apparatus 100 will be described. FIG. 11 is a flowchart illustrating a motion example of display control of display control apparatus 100. Since the confirmation of the periphery of vehicle 1 should be performed before the vehicle is activated to start traveling, the processing in FIG. 11 is performed as appropriate when, for example, the driver has turned on the ignition key to activate and vehicle 1.

As illustrated in FIG. 11, display control apparatus 100 determines, after the activation, circulation conditions for the virtual visual points (step S101) and displays a circulation image in which a display image changes in a way of looking around the surroundings of vehicle 1 (step S102).

The circulation conditions are, for example, the initial value and rotational direction of the line-of-sight direction, and the rotational pattern and/or the rotational speed may be added. Further, the circulation conditions may be determined in accordance with history information or a configuration by the user. For example, the rotation may be caused in the same direction as when the last circulation display is performed or the rotation may be performed at a speed configured by the user. Further, the circulation conditions may be determined in accordance with the last motion of the vehicle. For example, when the vehicle is parked at the left end of the road, the initial value for the line-of-sight direction may be at the rear of the vehicle and the line-of-sight direction may be turned counterclockwise to assist in smooth rearward confirmation.

Next, display control apparatus 100 determines whether there is an operation of the user (step S103). In a case where there is no operation of the user as a result of the determination (step S103, NO), the processing returns to step S102 and the circulation image is displayed continuously.

In a case where there is an operation of the user (step S103, YES), on the other hand, display control apparatus 100 determines whether the operation of the user is a termination condition (step S104). In a case where the operation of the user is not the termination condition as a result of the determination (step S104, NO), display control apparatus 100 may change the circulation conditions in accordance with the operation of the user (step S105).

For example, in a case where the user operates the right-hand turn signal, display control apparatus 100 may configure the line-of-sight direction to the front and rotate the line-of-sight direction clockwise. Further, in the case of the reverse gear as the gear position, display control apparatus 100 may move the visual point and the line-of-sight direction such that the line-of-sight direction sequentially looks around the rear, left and right, as in just the rear, the right rear, just the rear, the left rear, and just the rear, at intervals of one second, for example. That is, instead of rotating the line-of-sight direction in a fixed direction, a repetitive motion to reciprocate the line-of-sight direction in a fixed range may be performed.

In a case where the operation of the user is the termination condition (step S104, YES), on the other hand, display control apparatus 100 terminates the display of the circulation image. The termination condition is, for example, an operation to cause vehicle 1 to travel, such as a gas pedal operation. The circulation image has a strong line-of-sight guidance effect since the screen of display 30 continues to change at all times. When the circulation image is displayed while vehicle 1 is traveling, the circulation image prevents the forward gaze of the driver, and thus, the circulation display needs to be terminated at least when vehicle 1 starts traveling.

The present embodiment configured as described above makes it possible to obtain a vehicle periphery image that makes the line-of-sight direction easily confirmable, and causes a subject image combined with the vehicle periphery image to be displayed, where the subject image and the vehicle periphery image are viewed in the same direction. As a result, the user can intuitively grasp the direction indicated by the vehicle periphery image.

Further, since the distance between the second virtual visual point and a subject is greater than the distance between the first virtual visual point and the subject, the area occupied by the subject image on a display image becomes small. As a result, it is possible to reduce a range in which a vehicle periphery image is blocked by a subject image.

Since the horizontal position of the first virtual visual point overlaps the horizontal position of the vehicle, the line of sight from the virtual visual point can be easily brought closer to the line of sight of the user. Further, since the horizontal position of the second virtual visual point does not overlap the horizontal position of the vehicle, it is possible to easily cause the user to grasp the orientation of a subject image that is superimposed on a vehicle periphery image.

Further, since both the azimuth of the first line of sight and the azimuth of the second line of sight are simultaneously changed such that the azimuth of the first line of sight and the azimuth of the second line of sight are identical, it is possible to suppress a shift between the orientation of a vehicle periphery image and the orientation of a subject image. As a result, it is possible to cause the user to easily grasp the direction indicated by a vehicle periphery image intuitively. In other words, it may be said that such a display control apparatus includes: a visual point mover that moves at least one of a first virtual visual point and/or a second virtual visual point; and a line-of-sight changer that simultaneously changes both an azimuth of a first line of sight and an azimuth of a second line of sight in synchronization with movement of the first virtual visual point or the second virtual visual point. The line-of-sight changer simultaneously changes both the azimuth of the first line of sight and the azimuth of the second line of sight such that the azimuth of the first line of sight is identical to the azimuth of the second line of sight.

Further, since two virtual visual points are disposed such that first virtual visual point V1 in a vehicle periphery image and second virtual visual point V2 in a subject image are on the same side as viewed from the center of a circle of movement paths for the virtual visual points, it is possible to disposed the two virtual visual points at positions closer to each other. As a result, it is possible to make movement of a display image natural.

Figure 12:
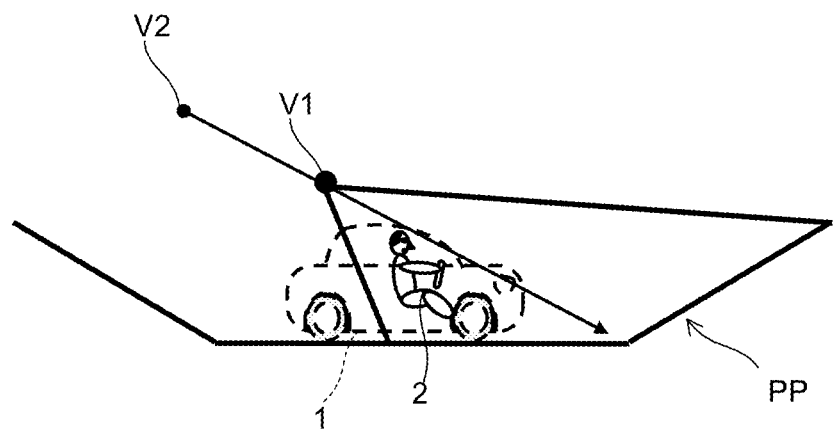
FIG. 12 is a diagram when a subject in FIG. 7 is a driver.

Note that, although an example in which a line-of-sight direction in a display image is indicated by superimposing a subject image based on a vehicle on a vehicle periphery image has been indicated in the embodiment described above, the present disclosure is not limited thereto. For example, as illustrated in FIG. 12, an image of driver (occupant) 2 who is the subject of vehicle periphery monitoring may be displayed instead of an image of vehicle 1. In this case, the driver or both the driver and the vehicle may be referred to as the subject. Further, an image including both the driver and the vehicle may be referred to as a vehicle image. Note that, FIG. 12 indicates an example in which driver 2 is illustrated as a solid line and vehicle 1 is illustrated as a dashed line.

An image of the driver as the subject image is suitable for monitoring the periphery of a vehicle since the size of the subject on a display image becomes small and a range, which is hidden by the subject, in a vehicle periphery image is narrowed. That is, it is possible to confirm a vehicle periphery image without omission by changing a subject image, which is superimposed on the vehicle periphery image, to an image of the driver.

Figure 13A:
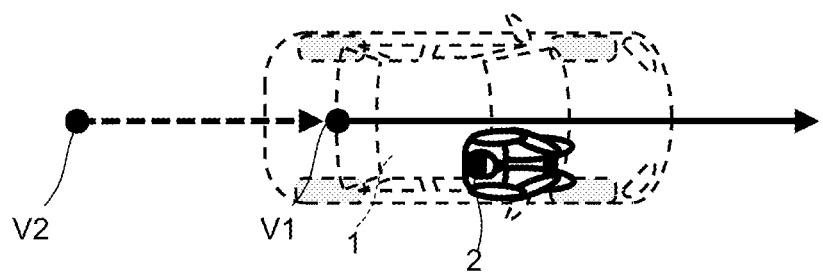
FIG. 13A illustrates a positional relationship between a driver and the virtual visual point when the subject is the driver.

Further, in a case where both driver 2 and vehicle 1 are displayed as the subject as illustrated in FIG. 13A, causing the position of the driver in the vehicle to be reflected as is on a display image leads to driver 2 being displayed at a position shifted to the left or right from the center of the display image when the line-of-sight direction in a vehicle periphery image is just the front of vehicle 1. At this time, it may be recognized that the front of driver 2 having been displayed is the center of the vehicle periphery image (line-of-sight direction). In particular, when a figure of vehicle 1 is displayed in a semi-transparent manner or when only driver 2 is displayed and a figure of vehicle 1 is not displayed, the line-of-sight direction in a vehicle periphery image may be recognized as being shifted.

Figure 13B:
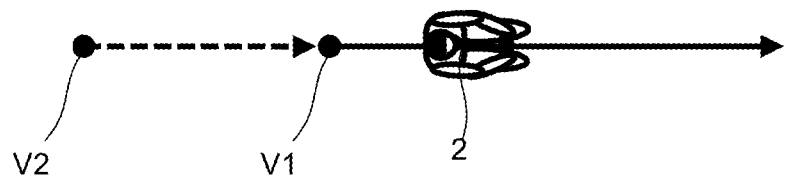
FIG. 13B illustrates the positional relationship between the driver and the virtual visual point when the subject is the driver.

Accordingly, it may be configured such that a subject image is outputted with the driver being positioned on the median line of the vehicle and the driver is reflected in the center of a display image as illustrated in FIG. 13B. When the position of the driver is adjusted such that the head portion of the driver is in the azimuth of the line of sight in a subject image at all times, the head portion of the driver is reflected in the center of a display image at all times. Note that, since a subject image is displayed for the purpose of indicating the orientation of a vehicle periphery image that is displayed, the subject may not be in the direction of line-of-sight direction V1 in the vehicle periphery image, and may remain at the position of driver 2 in the vehicle as in FIG. 13B, for example. In other words, this may be said that an azimuth of first line of sight S1 in which a periphery of a vehicle is viewed from first virtual visual point V1 is substantially identical to an azimuth of second line of sight S2 in which a subject is viewed from second virtual visual point V2, and an azimuth of first virtual visual point V1 with respect to second virtual visual point V2 is identical to the azimuth of second line of sight S2. That is, since the line-of-sight directions need not be completely identical but may be substantially identical, for example, the azimuth of the second line of sight may be (although slightly deflected from the azimuth of the first line of sight) an azimuth in which driver 2 is viewed from second virtual visual point V2, or the second virtual visual point may be (although slightly shifted from just the rear of second virtual visual point V2) positioned at just the rear of driver 2.

Further, in the embodiment described above, a projection plane on which the first projection of a captured image is performed is formed of a combination of a flat plane (first plane) and an inclined plane (second plane) erected in a distance, but the present disclosure is not limited thereto. For example, a projection plane may be formed only of a continuous curved plane or a projection plane may include a spherical plane.

Figure 14:
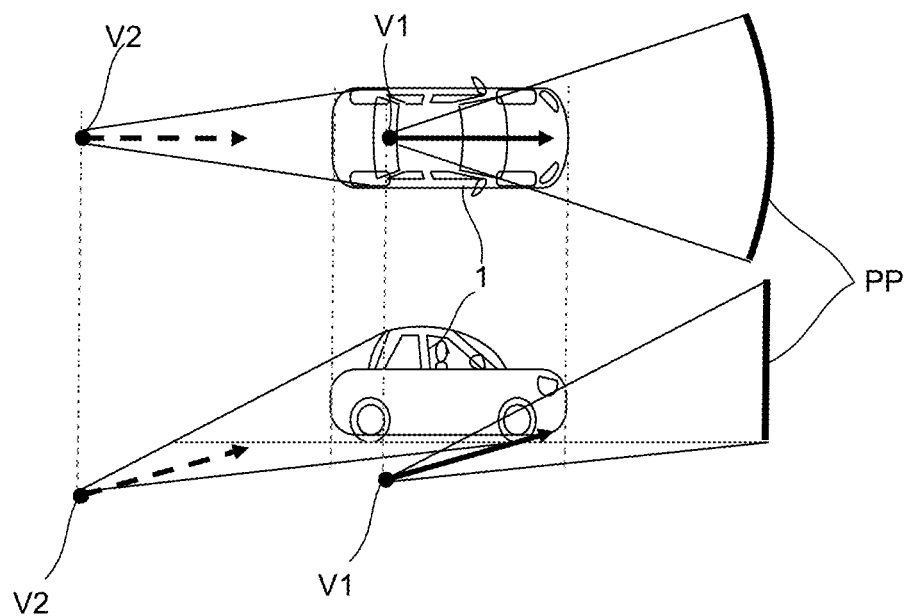
FIG. 14 illustrates a disposition example of a projection plane when the projection plane is cylindrical.

Further, as illustrated in FIG. 14, projection plane PP may be cylindrical and a projection plane corresponding to the road surface may not be provided. Further, first virtual visual point V1 and second virtual visual point V2 may not be provided above a vehicle, but may be provided below a vehicle. Further, as another example, first virtual visual point V1 in a vehicle periphery image may be provided inside vehicle 1, and in particular first virtual visual point V1 in a vehicle periphery image may be caused to match the visual point position of the driver. This is because even when the visual point position in a vehicle periphery image is inside a vehicle, a vehicle image does not become an image of the interior of the cabin of the vehicle since a vehicle image is not generated with the visual point position in the vehicle periphery image.

Further, in a case where the visual point position in a vehicle periphery image is placed at a position corresponding to the underground (below a vehicle), a subject image is superimposed on a center upper portion of the vehicle periphery image on a display image. In this case, the bottom surface of a vehicle may be caused to be understandable by adding a three-D object, which evokes an axle, to the bottom surface of a three-D model of the vehicle. Further, it may be configured such that it is indicated to the driver which direction a displayed vehicle periphery image is in by adding an object, which evokes the driver, to a three-D model of a vehicle and displaying the three-D model of the vehicle in a semi-transparent manner. Further, when a vehicle image viewed from below is displayed, it may be configured such that an arrow indicating the direction of the leading end of a vehicle is displayed on the bottom surface of a figure of vehicle 1.

Further, in the embodiment described above, a subject image is superimposed while protruding from a blind-spot region in a vehicle periphery image, but the present disclosure is not limited thereto. For example, a subject image may be superimposed such that the subject image overlaps a blind-spot region, on which no image is projected, in a vehicle periphery image, and the subject image may be superimposed by changing the size or shape of the subject image such that an amount of the subject image overlapping an effective region, on which an image is projected, in the vehicle periphery image becomes small. Alternatively, a subject image may be superimposed by changing the size or shape of the subject image such that the subject image does not overlap the effective region. This adjustment of the size or shape of a subject image may be performed by image superimposer 150 or subject image outputter 140 may output a subject image that has been adjusted in advance.

Figure 15A:
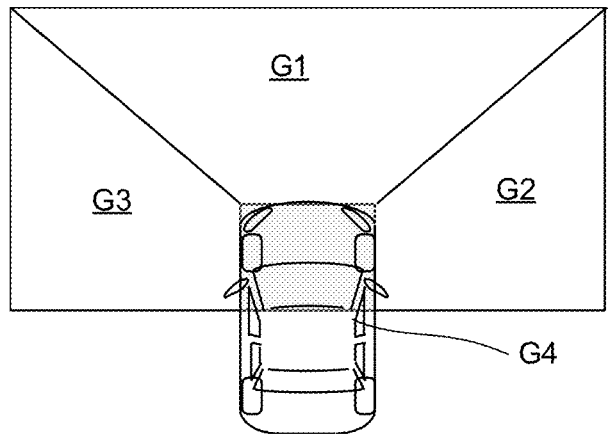
FIG. 15A illustrates an example of a display image when a subject image is reduced.

In a captured image projected on a projection plane by the first projection, a portion beneath a vehicle is blank due to being a blind spot for capturer 10. Accordingly, as illustrated in FIG. 15A, when a subject image is displayed such that the subject image fits into a blind spot portion by making the size of the subject image smaller than the size of a figure viewed from the visual point position in a vehicle and/or by adjusting a position at which a vehicle-combined image is displayed, no portion reflected on captures images is hidden by the subject image, and thus, a vehicle periphery image can be visually recognized without omission.

Figure 15B:
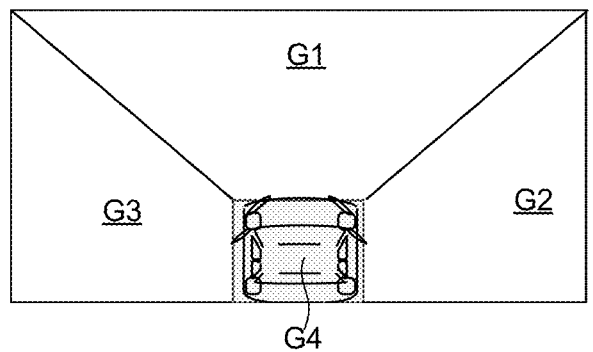
FIG. 15B illustrates an example of the display image when the subject image is reduced.

Further, in a case where it is inconvenient in terms of screen design that it is configured such that a portion of a subject image is not covered by a display region in a vehicle periphery image when the subject image is superimposed on the vehicle periphery image on a display image, the subject image may be deformed to fit into a blind spot portion as illustrated in FIG. 15B.

As described above, by adjusting the position or size of a subject image to cause the subject image not to hide a vehicle periphery image, it is possible to confirm the vehicle periphery image without omission.

Further, in a case where a vehicle is hard to visually recognize when a subject image is deformed, it may be configured such that the size of the subject image is reduced to a size that allows the subject image to fit into a blind spot portion, whereas a blind spot portion that is not covered by the subject image is provided with a blind spot portion-indicating display. In other words, image superimposer 150 performs a blind spot-indicating display in a region, which does not overlap a subject image, in a blind-spot region.

Figure 16A:
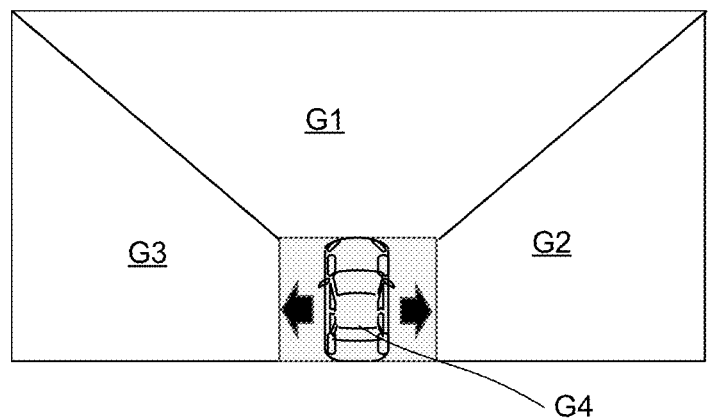
FIG. 16A illustrates an example of the display image to which a blind spot-indicating display is added.

The blind spot-indicating display may be, for example, a display of an arrow(s) extending from a vehicle as illustrated in FIG. 16A. Further, in addition to the arrow, the blind spot-indicating display may be an achromatic color display in which a blind-spot region is displayed in black, white, gray or the like, or may be a display using hatching.

Figure 16B:
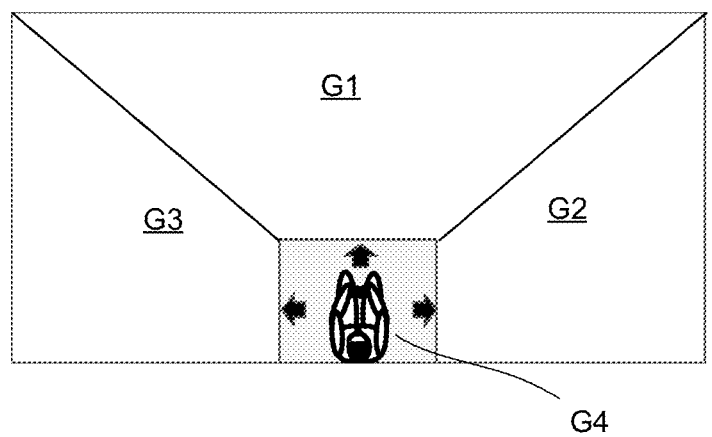
FIG. 16B illustrates an example of the display image to which the blind spot-indicating display is added.

Further, as illustrated in FIG. 16B, when the subject image is changed from an image of the vehicle to an image of the driver, the subject image becomes small, and thus, the subject image easily fits into a blind spot portion. In a case where the orientation of the driver is hard to recognize on a display image when a figure of the driver is displayed in a size as it is, a subject image may be enlarged and displayed, or a blind spot portion that is not covered by the subject image may be provided with a blind spot portion-indicating display.

Figure 17:
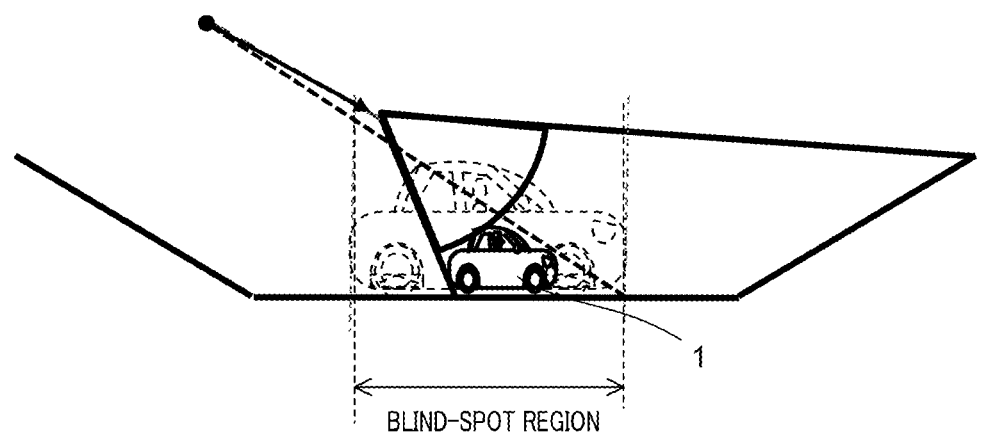
FIG. 17 illustrates an example of reduction in the subject image.

Further, in the method of reducing a subject image, a figure whose three-D model corresponding to the size of the actual vehicle body is viewed may be reduced or it may be configured, as illustrated in FIG. 17, such that a figure whose three-D model is viewed does not protrude from a blind-spot region below the vehicle body by making the three-D model smaller than the actual size of the vehicle body.

Further, the position of a three-D model may be adjusted such that no protrusion from a blind-spot region occurs or the position of a three-D model may be adjusted such that no protrusion from the visual field of a vehicle periphery image occurs. Further, in a case where the subject in a vehicle image is changed from the vehicle to the driver, the size of the vehicle image may be configured such that the subject is reflected larger by making the distance between the visual point position and a three-D model of the subject shorter than the distance therebetween in a case where the subject is the vehicle.

Further, in the embodiment described above, the visual point position (virtual visual point) is circulated on a circular orbit, the present disclosure is not limited thereto, and the visual point position (virtual visual point) may be moved on an arc, which is a portion of the circumference, and reciprocated on an orbit. In other words, the movement path on which the virtual visual point moves may have a shape of an arc.

Figure 18:
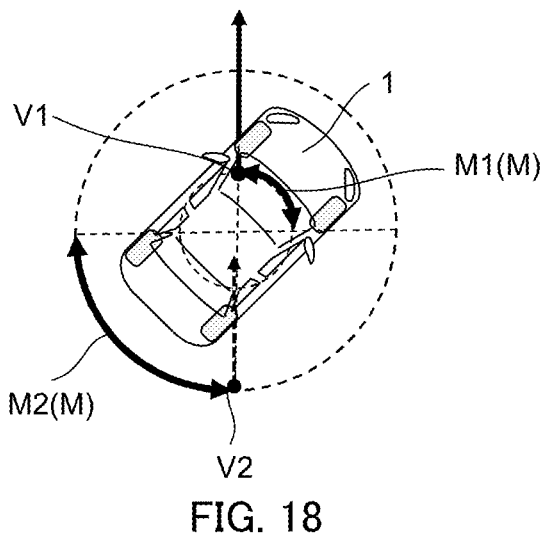
FIG. 18 illustrates a variation of the movement path for the virtual visual point.

Further, in the embodiment described above, two virtual visual points are disposed such that first virtual visual point V1 in a vehicle periphery image and second virtual visual point V2 in a subject image are on the same side as viewed from the center of a vehicle (or the center of an arc of an orbit), the present disclosure is not limited thereto. For example, as illustrated in FIG. 18, two virtual visual points may be disposed such that first virtual visual point V1 in a vehicle periphery image and second virtual visual point V2 in a subject image are on sides opposite to each other across the center of a vehicle.

Such a configuration makes it possible to bring first virtual visual point V1 close to a projection plane, and thus, it is possible to cause a middle portion of a display image in the line-of-sight direction to be displayed large on a display image.

Further, although both the first virtual visual point and the second virtual visual point move in the embodiment described above, the present disclosure is not limited thereto. It may be configured such that at least one of the first virtual visual point and/or the second virtual visual point moves.

Figure 19A:
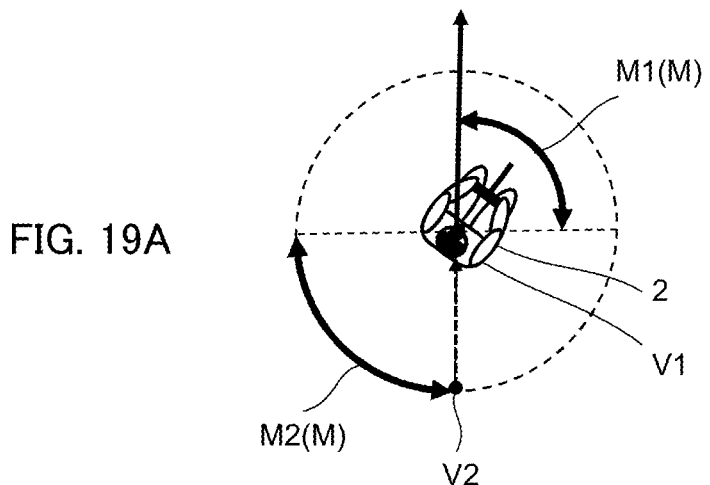
FIG. 19A illustrates a variation of the movement path for the virtual visual point.

In this case, for example, as illustrated in FIG. 19A, first virtual visual point V1 in a vehicle periphery image may be fixed and the line-of-sight direction in the vehicle periphery image may be changed in accordance with movement of second virtual visual point V2 in a subject image.

Such a configuration makes it possible to stabilize the portion of a vehicle periphery image in a display image since the visual point in the vehicle periphery image does not move.

Figure 19B:
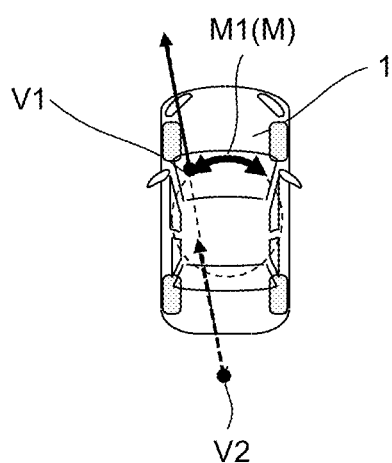
FIG. 19B illustrates a variation of the movement path for the virtual visual point.

Further, as illustrated in FIG. 19B, second virtual visual point V2 in a subject image may be fixed and the line-of-sight direction in the subject image may be changed in accordance with movement of first virtual visual point V1 in a vehicle periphery image.

With such a configuration, the first virtual visual point moves to the right side of a vehicle or the left side of the vehicle when the vehicle periphery image in the diagonal right direction or the diagonal left direction of the vehicle is displayed, for example. As a result, the vehicle periphery images corresponding to the right and left sides can be easily viewed.

Further, as illustrated in FIG. 19A, in a case where first virtual visual point V1 which is one virtual visual point is fixed, the virtual visual point may be fixed to the center of a circle or arc on which the other visual point moves. As illustrated in FIG. 19B, in a case where second virtual visual point V2 which is one virtual visual point is fixed, the virtual visual point may be fixed at a position different from the center of a circle or arc on which the other visual point moves. In other words, it may be said, when a case where both the visual points are moved is included, that a movement path on which at least one of a first virtual visual point and/or a second virtual visual point moves has a shape of a circle or arc; in a case where one of the first virtual visual point and the second virtual visual point moves, a horizontal position of a center of a circle or arc, which is the movement path for the virtual visual point that moves, is identical to a horizontal position of the virtual visual point that does not move; and in a case where both the first virtual visual point and the second virtual visual point move, a horizontal position of a center of a circle or arc that is the movement path for one virtual visual point of the first virtual visual point and the second virtual visual point is identical to a horizontal position of a center of a circle or arc that is the movement path for the other virtual visual point of the first virtual visual point and the second virtual visual point.

Further, as illustrated in FIG. 19A, the subject image may be changed from an image of the vehicle to an image of the driver. At that time, the image of the driver may displayed larger than the actual image of the driver or it may be configured such that the front direction of the driver is easily visually recognizable by displaying the steering wheel held by the driver large. Further, when a three-D model of the driver is disposed such that the head portion of the driver is positioned in the center of a vehicle and the visual point position or the center point of an orbit on which the visual point rotates is caused to match the position of the head portion of the driver, the head portion of the driver does not move on a display image, and thus, the driver easily gazes at a vehicle periphery image.

In either example, the line-of-sight direction in a vehicle periphery image and the line-of-sight direction in a subject image are controlled such that the azimuth of the line of sight in the vehicle periphery image and the azimuth of the line of sight in the subject image are identical and the azimuth of the visual point in the vehicle periphery image with respect to the virtual visual point in the subject image is identical to the azimuth of the line of sight in the subject image.

Further, although the azimuth of the first line of sight is identical to the azimuth of the second line of sight, and the azimuth of the first virtual visual point with respect to the second virtual visual point is identical to the azimuth of second line of sight in the embodiment described above, the present disclosure is not limited thereto. For example, each azimuth may be shifted to the extent that each azimuth can be regarded as substantially identical. Further, a space in which a three-D model that serves as a base of a subject image is placed may be configured to be a space different from a space in which a projection plane on which a vehicle periphery image is generated is placed. When both the spaces are configured to be different spaces, there is no longer a positional relationship between the visual point in a subject image and the visual point in a vehicle periphery image, but when the azimuth of the line of sight in the vehicle periphery image and the azimuth of the line of sight in the subject image are substantially identical, the direction indicated by the vehicle periphery image can be correctly grasped from a display image obtained by superimposing the subject image on the vehicle periphery image. Alternatively, it may be said in other words that in a case where spaces in which a projection plane and a three-D model are present are not specified, the azimuth of the first line of sight in which the periphery of a vehicle is viewed from the first virtual visual point is caused to be substantially identical to the azimuth of the second line of sight in which a subject is viewed from the second virtual visual point; and in a case where the projection plane and the three-D model are present in the same space, the azimuth of the first line of sight in which the periphery of the vehicle is viewed from the first virtual visual point is caused to be substantially identical to the azimuth of the second line of sight in which the subject is viewed from the second virtual visual point and the azimuth of the first virtual visual point with respect to the second virtual visual point is caused to be substantially identical to the azimuth of the second line of sight.

In addition, any of the embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2022-072548, filed on Apr. 26, 2022, the disclosure of which including the specification, drawings and abstract is incorporated herein by reference in its entirety.

INDUSTRIAL APPLICABILITY

The display control apparatus of the present disclosure is useful as a display control apparatus capable of intuitively grasping a direction indicated by a vehicle periphery image.

The invention claimed is:
1. A display control apparatus, comprising:
a processor that is mounted in a vehicle and receives a captured image obtained by capturing a periphery of the vehicle, wherein
the processor generates, based on the captured image having been received, a vehicle periphery image indicating the periphery of the vehicle viewed from a first virtual visual point,
the processor outputs, based on three-dimensional data indicating a subject, a subject image indicating the subject viewed from a second virtual visual point different from the first virtual visual point, the subject monitoring the periphery of the vehicle and being one of an occupant of the vehicle, the vehicle, or both the vehicle and the occupant,
the processor generates a display image by superimposing the subject image on the vehicle periphery image,
an azimuth of a first line of sight is substantially identical to an azimuth of a second line of sight, the azimuth of the first line of sight being an azimuth in which the periphery of the vehicle is viewed from the first virtual visual point, the azimuth of the second line of sight being an azimuth in which the subject is viewed from the second virtual visual point,
the processor moves at least one of the first virtual visual point or the second virtual visual point, the processor simultaneously changes both the azimuth of the first line of sight and the azimuth of the second line of sight in synchronization with movement of the at least one of the first virtual visual point or the second virtual visual point, and the processor simultaneously changes both the azimuth of the first line of sight and the azimuth of the second line of sight such that the azimuth of the first line of sight becomes identical to the azimuth of the second line of sight.

2. The display control apparatus according to claim 1, wherein an azimuth of the first virtual visual point with respect to the second virtual visual point is substantially identical to the azimuth of the second line of sight.

3. The display control apparatus according to claim 2, wherein a distance between the second virtual visual point and the subject is greater than a distance between the first virtual visual point and the subject.

4. The display control apparatus according to claim 2, wherein
a horizontal position of the first virtual visual point overlaps a horizontal position of the vehicle, and
a horizontal position of the second virtual visual point does not overlap the horizontal position of the vehicle.

5. The display control apparatus according to claim 2, wherein
the processor superimposes the subject image such that the subject image overlaps a blind-spot region in the vehicle periphery image, the blind-spot region being a region on which no image is projected, and
the processor superimposes the subject image by changing a size or a shape of the subject image such that an amount of the subject image overlapping an effective region in the vehicle periphery image becomes small or the processor superimposes the subject image by changing the size or the shape of the subject image such that the subject image does not overlap the effective region, the effective region being a region on which an image is projected.

6. The display control apparatus according to claim 5, wherein the processor performs a blind spot-indicating display in a region in the blind-spot region, the region in the blind-spot region not overlapping the subject image.

7. The display control apparatus according to claim 6, wherein the blind spot-indicating display is one of an arrow display, an achromatic color display, or a display using hatching.

8. The display control apparatus according to claim 1, wherein a distance between the second virtual visual point and the subject is greater than a distance between the first virtual visual point and the subject.

9. The display control apparatus according to claim 1, wherein
a horizontal position of the first virtual visual point overlaps a horizontal position of the vehicle, and
a horizontal position of the second virtual visual point does not overlap the horizontal position of the vehicle.

10. The display control apparatus according to claim 1, wherein
a movement path on which the at least one of the first virtual visual point or the second virtual visual point moves includes a shape of a circle or an arc,
in a case where one of the first virtual visual point or the second virtual visual point moves, a horizontal position of a center of the circle or the arc is identical to a horizontal position of a second one of the first virtual visual point or the second virtual visual point that does not move, the circle or the arc being the movement path for the one of the first virtual visual point or the second virtual visual point that moves, and in a case where both the first virtual visual point and the second virtual visual point move, the horizontal position of the center of the circle or the arc that is the movement path for the one of the first virtual visual point or the second virtual visual point is identical to the horizontal position of the center of the circle or the arc that is the movement path for the second one of the first virtual visual point or the second virtual visual point.

11. A display control apparatus comprising:
a processor that is mounted in a vehicle and receives a captured image obtained by capturing a periphery of the vehicle, wherein
the processor generates, based on the captured image having been received, a vehicle periphery image indicating the periphery of the vehicle viewed from a first virtual visual point,
the processor outputs, based on three-dimensional data indicating a subject, a subject image indicating the subject viewed from a second virtual visual point different from the first virtual visual point, the subject monitoring the periphery of the vehicle and being one of an occupant of the vehicle, the vehicle, or both the vehicle and the occupant,
the processor generates a display image by superimposing the subject image on the vehicle periphery image,
an azimuth of a first line of sight is substantially identical to an azimuth of a second line of sight, the azimuth of the first line of sight being an azimuth in which the periphery of the vehicle is viewed from the first virtual visual point, the azimuth of the second line of sight being an azimuth in which the subject is viewed from the second virtual visual point,
the processor superimposes the subject image such that the subject image overlaps a blind-spot region in the vehicle periphery image, the blind-spot region being a region on which no image is projected, and
the processor superimposes the subject image by changing a size or a shape of the subject image such that an amount of the subject image overlapping an effective region in the vehicle periphery image becomes small or the processor superimposes the subject image by changing the size or the shape of the subject image such that the subject image does not overlap the effective region, the effective region being a region on which an image is projected.

12. The display control apparatus according to claim 11, wherein the processor performs a blind spot-indicating display in a region in the blind-spot region, the region in the blind-spot region not overlapping the subject image.

13. The display control apparatus according to claim 12, wherein the blind spot-indicating display is one of an arrow display, an achromatic color display, or a display using hatching.

* * * * *